US007296762B2

(12) United States Patent
Dorion

(10) Patent No.: US 7,296,762 B2
(45) Date of Patent: Nov. 20, 2007

(54) FOOD PRESS

(75) Inventor: Christopher Dorion, Elmhurst, IL (US)

(73) Assignee: AMCO Houseworks, LLC, Vernon Hills, IL (US)

( * ) Notice: Subject to any disclaimer, the term of this patent is extended or adjusted under 35 U.S.C. 154(b) by 211 days.

(21) Appl. No.: 11/067,236

(22) Filed: Feb. 25, 2005

(65) Prior Publication Data
US 2006/0191422 A1 Aug. 31, 2006

(51) Int. Cl.
A47J 17/00 (2006.01)

(52) U.S. Cl. .................. 241/169; 241/DIG. 27
(58) Field of Classification Search .......... 241/169, 241/169.2, DIG. 27; 100/112, 213, 131, 100/126, 234, 243; 99/510, 495; D7/666, D7/665
See application file for complete search history.

(56) References Cited

U.S. PATENT DOCUMENTS

| D46,909 S * | 2/1915 | Godwin ............... D7/576 |
| 5,463,941 A * | 11/1995 | Gibson ................ 99/495 |
| 5,467,699 A | 11/1995 | Laib |
| 5,513,562 A | 5/1996 | Moor |
| 5,520,104 A | 5/1996 | Ancona et al. |
| 5,791,237 A | 8/1998 | Gibson |
| 6,109,170 A | 8/2000 | Short et al. |
| 6,234,074 B1 * | 5/2001 | Mangum ............... 100/110 |
| 6,237,474 B1 | 5/2001 | Short et al. |
| D491,772 S | 6/2004 | Brousseau et al. |
| 7,117,785 B2 * | 10/2006 | Walker, III ............ 100/126 |
| 2004/0074403 A1 * | 4/2004 | Canizares et al. ......... 100/234 |

OTHER PUBLICATIONS

Amco Garlic Press.
Kitchenaid Garlic Press.
Kuhn Rikon Garlic Press.
OXO Garlic Press.
OXO i-Series Garlic Press.
Rösle Garlic Press.
Zyliss Garlic Press.

* cited by examiner

Primary Examiner—Faye Francis
(74) Attorney, Agent, or Firm—Michael Best & Friedrich LLP

(57) ABSTRACT

A food press having an upper handle rotatably connected to a lower handle. A press chamber and a slicer chamber are formed in the lower handle, and a press foot and a slicer foot are pivotally connected to said upper chamber and positioned to engage the press chamber and slicer chamber when the upper and lower handles are rotated together. At least part of the slicer chamber is a separately formed unit that has a plurality of blades, and that is inserted into the lower handle. The slicer foot has a plurality of ribs that are sized and shaped to be inserted between the blades such that the ribs extend beyond the blades when the upper and lower handles are rotated together. A cleaning piece is removably attached to the upper handle for cleaning the press chamber, slicer chamber and slicer foot.

21 Claims, 6 Drawing Sheets

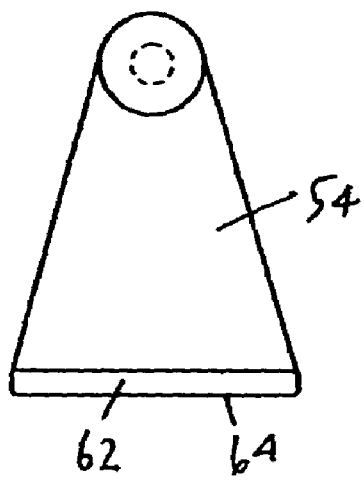
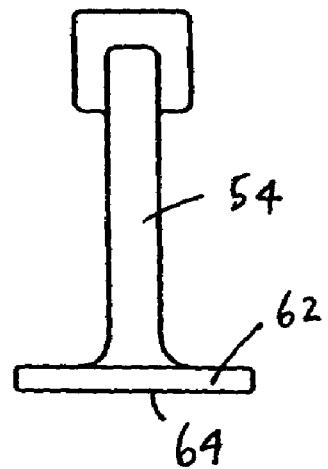
FIG. 5
FIG. 6
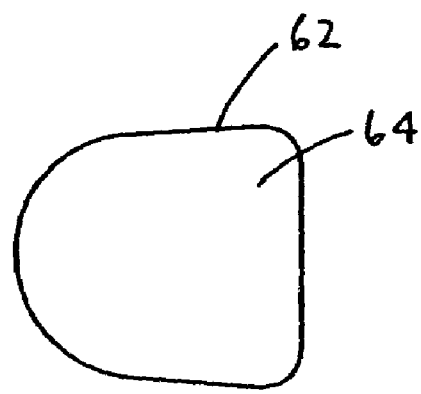
FIG. 7

FOOD PRESS

BACKGROUND OF THE INVENTION

The present invention relates to a food press and especially to a hand-held food press, such as a garlic press.

Hand-held food presses, such as a garlic press, are well known in the art and typically comprise pivotally connected upper and lower handles. The lower handle is provided with a press chamber for receiving food items, such as a garlic clove. The upper handle is provided with a press foot that is positioned to engage the press chamber and crush the garlic clove when the upper and lower handles are rotated together. The bottom of the press chamber is provided with a pattern of holes that permit fluid and particles of crushed garlic to be ejected from the chamber. Alternatively, the bottom of the press chamber may be provided with a number of parallel blades for slicing the garlic clove, instead of a pattern of holes.

Users are often forced to own separate tools for crushing or slicing garlic. In addition, separate implements must also be used for cleaning food particles or other debris trapped in the holes or between the blades of the press chamber. Thus, it is desirable to have a single food press that performs multiple functions, such as a combination of crushing and slicing functions, and that has a single implement for cleaning either the holes or blades of the press chamber.

BRIEF SUMMARY OF THE INVENTION

These needs and other needs are satisfied by the present invention, which comprises a food press having an upper handle rotatably connected to a lower handle. First and second chambers are formed in the lower handle, and first and second feet are pivotally connected to the upper handle. When the upper and lower handles are rotated together, the first and second feet respectively engage the first and second chambers. The first chamber has a bottom with a plurality of holes forming a pattern and the second chamber has a plurality of blades. The first foot has a flat surface and the second foot has a plurality of ribs sized and shaped to be inserted between the blades in the second chamber. The ribs of the second foot extend beyond the blades of the second chamber when the upper and lower handles are rotated together.

In an alternative embodiment, the upper handle has first and second ends with the first and second feet pivotally connected to the upper handle at the first end. A post is positioned on the upper handle at the second end. A cleaning piece is provided for cleaning the holes of the first chamber, the blades of the second chamber and the ribs of the second foot. The cleaning piece has an opening sized and shaped to receive the post for removably attaching the cleaning piece to the upper handle. The cleaning piece has a plurality of nubs and an edge. The nubs form a pattern corresponding to the pattern of holes in the first chamber, and are sized and shaped to fit within the holes. The edge is sized and shaped to be inserted between the blades of the second chamber and between the ribs of the second foot.

In a further alternative embodiment, at least part of the second chamber is a separately formed unit, with the blades positioned in the separately formed unit.

In yet another embodiment, a stop is positioned on said upper handle such that the second foot is aligned to engage the second chamber when the second foot rests against the stop.

BRIEF DESCRIPTION OF THE DRAWINGS

FIG. 5 is a side elevation view of the press bar in the food press of FIG. 2.

FIG. 6 is a front elevation view of the press bar in the food press of FIG. 2.

FIG. 7 is a bottom plan view of the press bar in the food press of FIG. 2.

DETAILED DESCRIPTION OF THE INVENTION

Figure 1:
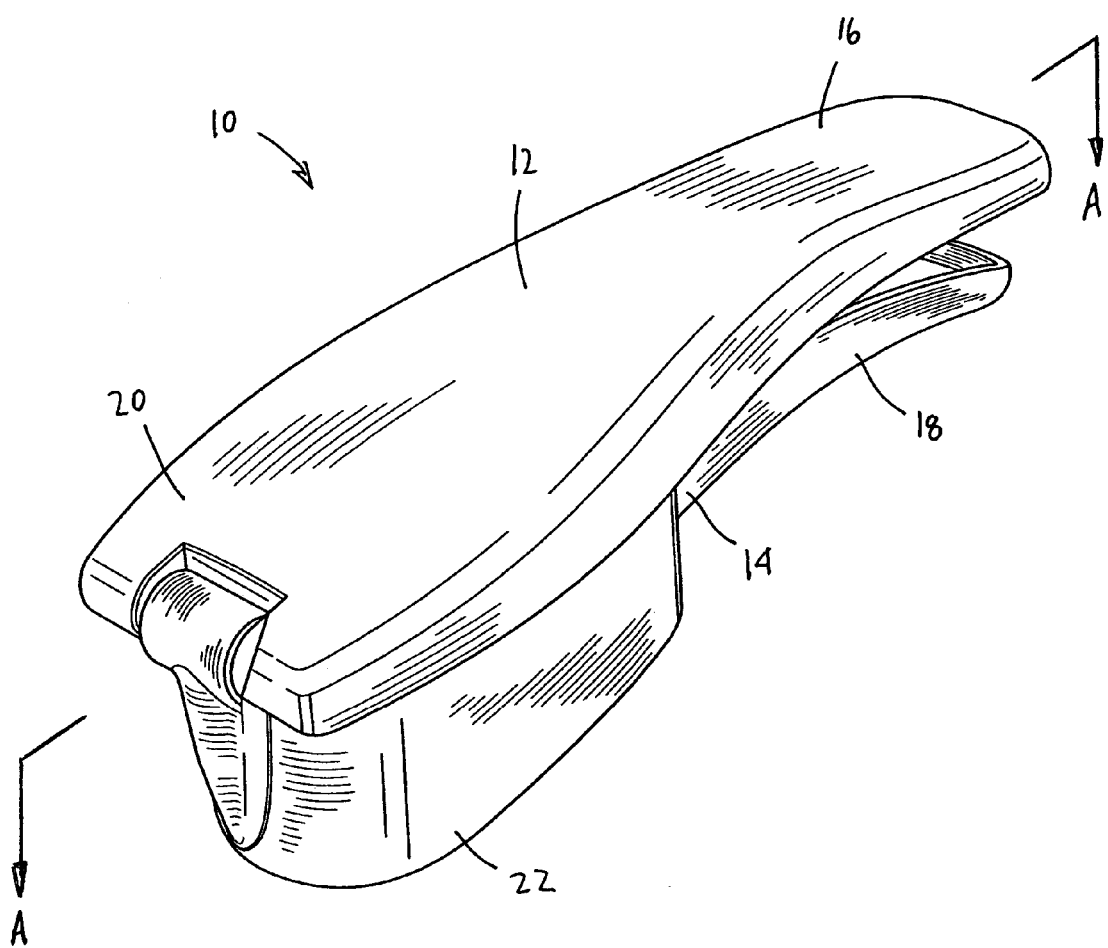
FIG. 1 is a top perspective view of an embodiment of the food press, with the upper and lower handles rotated together in the closed position.
Figure 2:
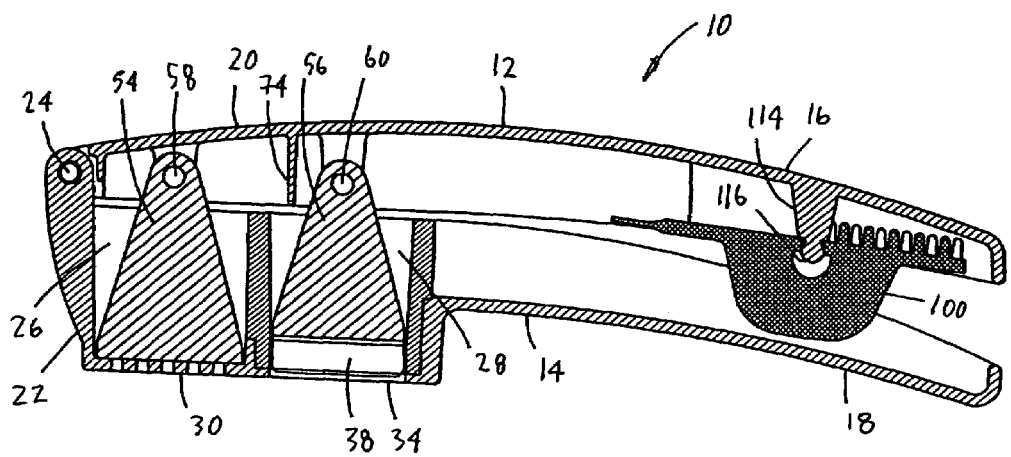
FIG. 2 is a vertical section view of the side of the food press of FIG. 1 taken along lines A-A, with the upper and lower handles rotated to together in the closed position.

Referring to FIGS. 1-4, a hand-held food press 10 is shown, comprising upper and lower handles 12, 14 having grip ends 16, 18 and press ends 20, 22. Upper and lower handles 12, 14 are rotatably connected by a pin 24 positioned at press ends 20, 22 of the handles. A press chamber 26 and a slicer chamber 28 are formed in the press end 22 of lower handle 14, with the press chamber positioned adjacent pin 24. As best seen in FIG. 2, the bottom 30 of press chamber 26 has a plurality of holes 32 forming a pattern. The bottom 34 of slicer chamber 28 has a rectangular opening 36 with a plurality of parallel blades 38.

Figure 3:
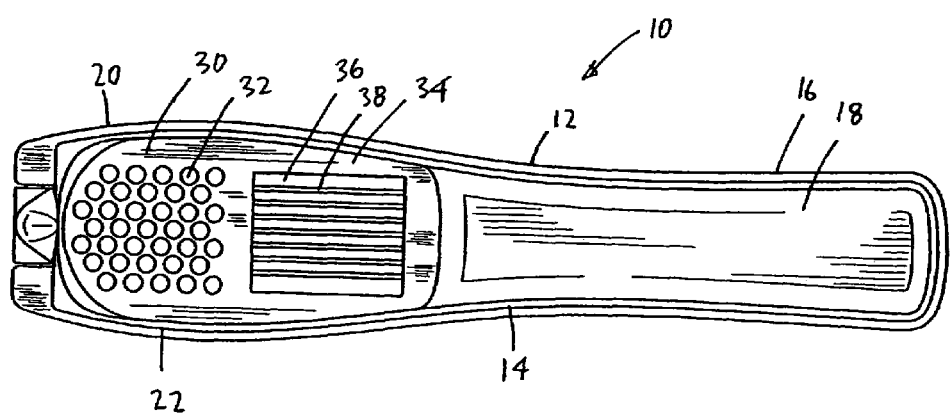
FIG. 3 is a bottom plan view of the food press of FIG. 1.

In a preferred embodiment, at least part of slicer chamber 28 is a separately formed slicer unit 40 inserted in lower handle 14. Blades 38 are positioned in slicer unit 40. As shown in FIG. 3, lower handle 14 has interior walls 42, 44 for positioning slicer unit 40 in the lower handle to form slicer chamber 28. Sides 46, 48 of slicer unit 40 are formed with notches 50, 52 that are sized and shaped to receive walls 42, 44. Slicer unit 40 may be attached to lower handle 14 by adhesive, welding or other methods that are known in the art. In an alternative embodiment, slicer unit 40 may be removably positioned within lower handle 14, to permit the user to interchangeably substitute other units 40 having different features or functions, such as a different number of blades for different size slices or blades of different shapes.

Press chamber 26 and slicer chamber 28 are sized and shaped to receive a clove of garlic or similar food item. In a preferred embodiment, press chamber 26 has a roughly square-shaped horizontal cross-section and encloses a volume that is approximately 30×30×30 mm. Bottom 30 of press chamber 26 has thirty-seven holes 32 arranged in a hexagonal close packed pattern that roughly corresponds to the shape of the bottom of the press chamber. Each hole 32 has a diameter of 2 mm.

Slicer chamber 28 has a rectangular horizontal cross-section that is approximately 30 mm in length and 25 mm in width at its top and tapers toward bottom 34 where rectangular opening 36 has a length of approximately 27 mm and width of approximately 22 mm. Slicer chamber 28 is approximately 25 mm in depth, not including the height of blades 38. Seven blades 38 extend across the length of the bottom 34 of slicer chamber 28, and are spaced approximately 2 mm apart. Each blade is approximately 6 mm high and 0.6 mm thick.

A press bar 54 and slicer bar 56 are pivotally connected to press end 20 of upper handle 12 by pins 58, 60. FIG. 1 shows handles 12, 14 rotated together in the closed position. Pins 58, 60 are respectively centered above press chamber 26 and slicer chamber 28, and press bar 54 and slicer bar 56 engage and are inserted into the press chamber and slicer chamber. Press bar 54 and slicer bar 56 are each sized and shaped to respectively fit within press chamber 26 and slicer chamber 28 and extend to the bottoms 30, 34 of each chamber when handles 12, 14 are rotated together in the closed position.

Figure 4:
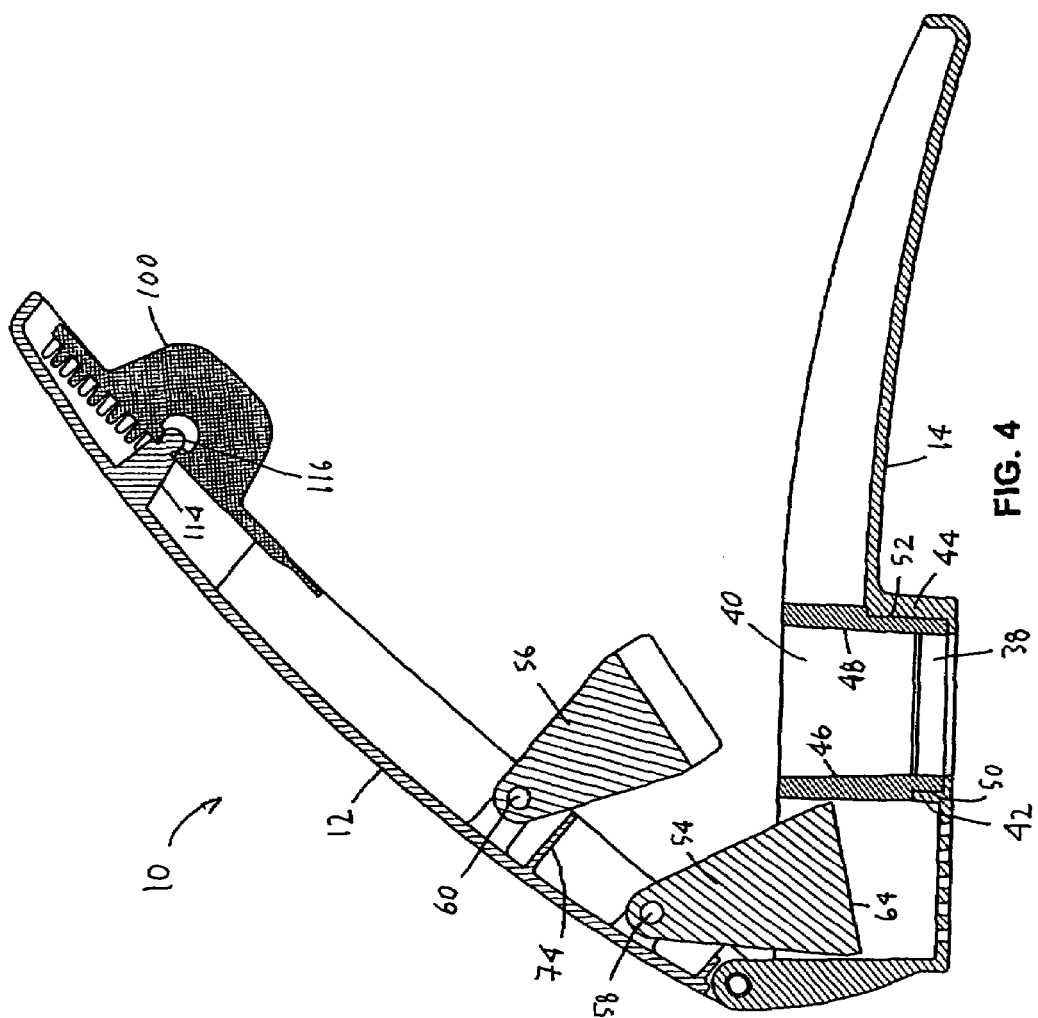
FIG. 4 is a vertical section view of the side of the food press as shown in FIG. 2, with the handles rotated partly together.

As shown in FIGS. 4-6, press bar 54 has a press foot 62 with a flat surface 64 sized and shaped to correspond to the bottom 30 of press chamber 12. When a garlic clove or other food item is placed in press chamber 26 and handles 12, 14 are rotated together, the garlic clove is crushed between flat surface 64 of press foot 62 and bottom 30 of the press chamber, such that any crushed particles and extracted fluids are ejected through holes 32.

Figure 8:
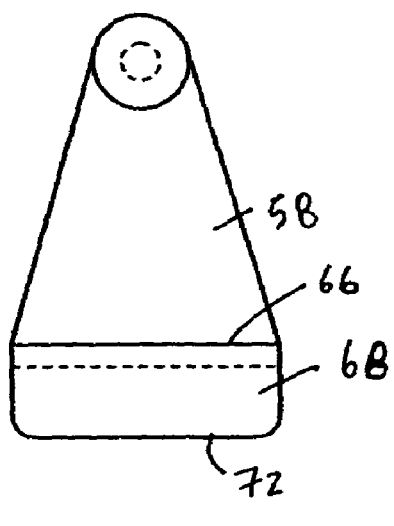
FIG. 8 is a side elevation view of the slicer bar in the food press of FIG. 2.
Figure 9:
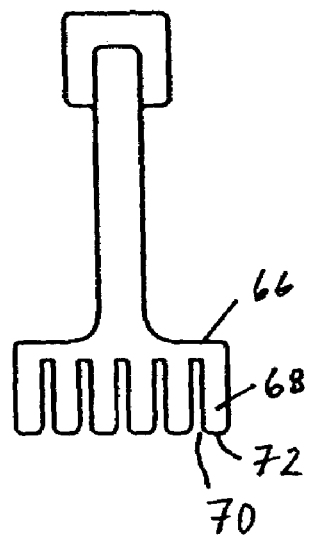
FIG. 9 is a front elevation view of the slicer bar in the food press of FIG. 2.

As shown in FIGS. 7-9, slicer bar 56 has a slicer foot 66 with a plurality of parallel ribs 68 separated by channels 70. When upper and lower handles 12, 14 are rotated to the closed position, ribs 68 and channels 70 are sized and shaped such that blades 38 are received in the channels and the ribs are inserted between the blades. In a preferred embodiment, the height of the ribs 68 is greater than the height of blades 38, such that when handles 12, 14 are in the closed position, ends 72 of the ribs extend approximately 1 mm beyond the blades, but do not extend beyond bottom 34 of slicer chamber 28. When a garlic clove or other food item is placed in slicer chamber 28 and handles 12, 14 are rotated together, slicer foot 66 presses the garlic clove against blades 38 which cut the garlic clove into a number of slices. As blades 38 are received in channels 70, ribs 68 push the cut slices from between the blades. When handles 12, 14 are rotated to the closed position, ends 72 of ribs 68 extend beyond blades 38 to ensure that the sliced garlic and any other matter is completely ejected from the blades.

In a preferred embodiment, a stop 74 is positioned in press end 20 of upper handle 12 to facilitate engagement and insertion of slicer bar 56 in slicer chamber 28. FIG. 3 shows handles 12, 14 rotated partly together with press bar 54 engaged, but not fully inserted into press chamber 26. Stop 74 is positioned adjacent slicer bar 56 and pin 60. As handles 12, 14 are rotated together toward the closed position, gravity causes slicer bar 56 to pivot on pin 60 and come to rest against stop 74, which is positioned to hold the slicer bar in alignment to engage slicer chamber 28. Thus, there is no need for the user to manually align slicer bar 56 with slicer chamber 28 when handles 12, 14 are rotated to the closed position.

Figure 10:
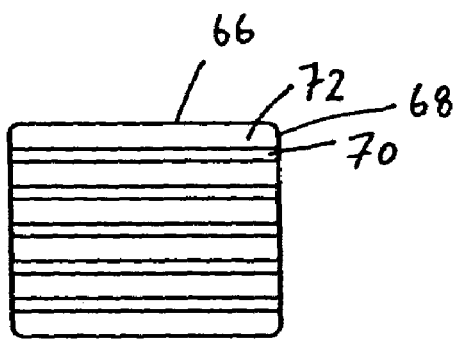
FIG. 10 is a bottom plan view of the slicer bar in the food press of FIG. 2.
Figure 11:
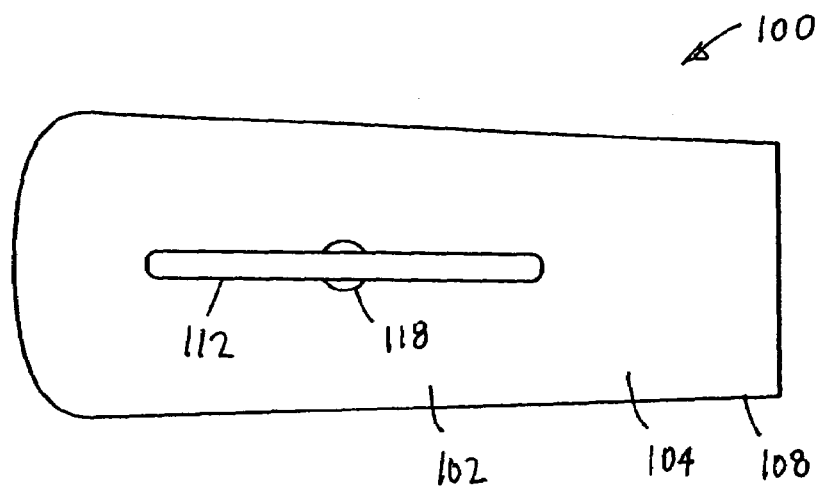
FIG. 11 is a top plan view of the cleaning piece in the food press of FIG. 2.
Figure 12:
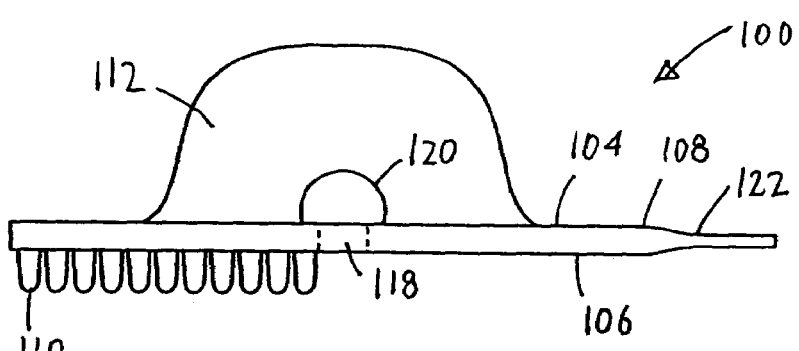
FIG. 12 is a side elevation view of the cleaning piece in the food press of FIG. 2.
Figure 13:
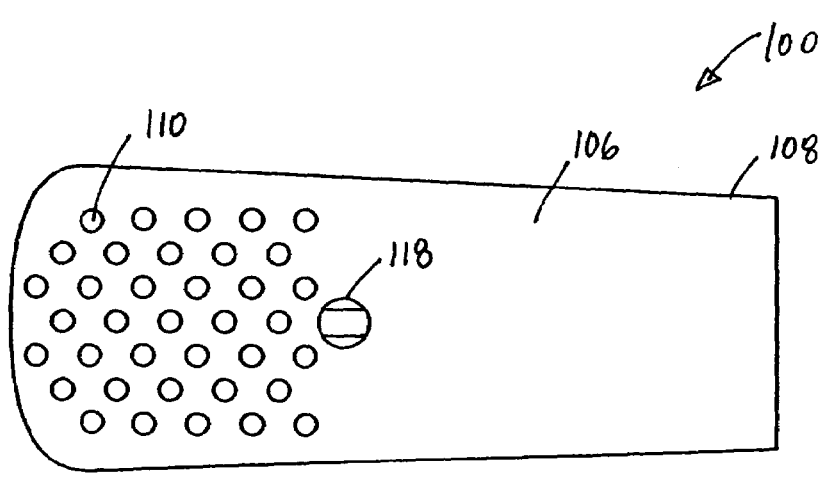
FIG. 13 is a bottom plan view of the cleaning piece in the food press of FIG. 2.

Food press 10 is provided with a separate cleaning piece 100 that is stored in grip end 16 of upper handle 12. As shown in FIGS. 10-12, cleaning piece 100 comprises a flat body 102 with top and bottom surfaces 104, 106. As best shown in FIGS. 10 and 12, body 102 has a tapered shape with a narrow end 108 that is used as a pick for cleaning blades 38 of slicer chamber 28 and channels 70 of slicer foot 66. Bottom surface 106 is provided with a plurality of nubs 110 that are used to clean holes 32 in the bottom 30 of press chamber 26. A handle 112 extends perpendicularly from top surface 104.

The tapered shape of body 102 is generally adapted to fit within the profile of grip end 16 of upper handle 12. As shown in FIGS. 1 and 3, cleaning piece 100 is removably attached to grip end 16 by a post 114 that ends in a rounded knob 116. A round opening 118 is formed in body 102 that has a diameter slightly smaller than knob 116, such that the knob snap fits within the opening to hold cleaning piece 100 on post 114. A cutout 120 is formed in handle 112 adjacent opening 118, to accommodate knob 116 as it projects through the opening.

As shown in FIGS. 11 and 12, a plurality of nubs 110 project perpendicularly from bottom surface 106 of body 102. Nubs 110 are sized and shaped to fit within and project through holes 32 in bottom 30 of press chamber 26, and the number and arrangement of the nubs 110 corresponds to the number and pattern of holes 32. Press chamber 26 is cleaned by placing cleaning piece 100 against the bottom 30 of the press chamber, such that nubs 110 simultaneously project through each of holes 32 to eject any trapped food particles or debris that has accumulated in the holes. In a preferred embodiment, nubs 110 are approximately 4 mm in height with rounded ends, and have a diameter that is slightly smaller than the diameter of holes 32.

As best shown in FIG. 11, narrow end 108 of cleaning piece 100 has a cross-section that forms an elongated wedge-shaped edge 122. The width of narrow end 108 and thickness of edge 122 are sized to permit the narrow end to be inserted between blades 38 of slicer chamber 28 and in channels 70 between ribs 68 of slicer foot 66. In a preferred embodiment, edge 122 is approximately 10 mm in length, with a width of about 24 mm and thickness of less than 1 mm, to permit the edge to be easily inserted between blades 38 and into channels 70 for removal of any trapped food particles or debris.

It is presently preferred to make food press 10 out of aluminum that is coated with a non-stick finish, which facilitates cleaning and prevents staining by various foods, such as tomato sauce. Any number of non-stick finishes may be used, such as teflon as are well known in the art. Cleaning piece 100 is preferably made of high density polyethylene. However, cleaning piece 100 may be made of various synthetic polymers and other materials that are sufficiently resilient to permit the cleaning piece to be snap fit to upper handle 12 and which are soft enough to prevent damage to the non-stick finish.

It will be apparent to those skilled in the art that changes and modifications may be made in the embodiments illustrated herein, without departing from the spirit and the scope of the invention. Thus, the invention is not to be limited to the particular forms herein shown and described except insofar as indicated by the scope of the appended claims.

What is claimed is:
1. A food press, comprising:
   an upper handle rotatably connected to a lower handle;
   a first chamber in said lower handle, said first chamber having a bottom with a plurality of holes forming a pattern;
   a second chamber in said lower handle, said second chamber having a plurality of blades;

a first foot pivotally connected to said upper handle, said first foot having a flat surface;

a second foot pivotally connected to said upper handle independently of said first foot, said second foot having a plurality of ribs sized and shaped to be inserted between said blades in said second chamber; and a stop on said upper handle between said first foot and said second foot, wherein said second foot is aligned to engage said second chamber when said second foot rests against said stop;

wherein said first and second feet respectively engage said first and second chambers when said upper and lower handles are rotated together.

2. The food press of claim 1, wherein said ribs extend beyond said blades when said second foot is engaged in said second chamber.

3. The food press of claim 1, further comprising:

a post positioned on said upper handle;

a cleaning piece for cleaning at least one of said first and second chambers;

an opening in said cleaning piece, said opening sized and shaped to receive said post for removably attaching said cleaning piece to said upper handle.

4. The food press of claim 3, wherein said post is friction fit within said opening in said cleaning piece.

5. The food press of claim 3, wherein said cleaning piece has a plurality of nubs forming a pattern corresponding to said pattern of said holes in said first chamber, said nubs sized and shaped to fit within said holes.

6. The food press of claim 3, wherein said cleaning piece has an edge, said edge sized and shaped to be inserted between said blades in said second chamber.

7. The food press of claim 6, wherein said edge is sized and shaped to be inserted between said ribs in said second foot.

8. The food press of claim 3, wherein said upper handle has first and second ends, said first and second feet pivotally connected to said upper handle at said first end and said post positioned on said upper handle at said second end.

9. The food press of claim 1, wherein at least part of said second chamber is a separately formed unit.

10. The food press of claim 9, wherein said blades are positioned in said separately formed unit.

11. A food press, comprising:

an upper handle rotatably connected to a lower handle;

first and second chambers in said lower handle;

first and second feet independently pivotally connected to said upper handle; and a stop adjacent to said second foot, wherein said stop aligns said second foot to engage said second chamber;

wherein, said first and second feet respectively engage said first and second chambers when said upper and lower handles are rotated together.

12. The food press of claim 11, further comprising:

a post extending from said upper handle;

a cleaning piece for cleaning at least one of said first and second chambers;

an opening in said cleaning piece, said opening sized and shaped to receive said post for removably attaching said cleaning piece to said upper handle.

13. The food press of claim 12, wherein said upper handle has first and second ends, said first and second feet pivotally connected to said upper handle at said first end and said post positioned on said upper handle at said second end.

14. The food press of claim 11, further comprising:

a pin rotatably connecting said upper and lower handles, said first foot connected to said upper handle adjacent said pin; and a stop positioned on said upper handle;

wherein said second foot is aligned to engage said second chamber when said second foot rests against said stop.

15. The food press of claim 11, wherein at least part of said second chamber is a separately formed unit.

16. The food press of claim 15, further comprising at least one blade positioned in said separately formed unit.

17. A food press, comprising:

an upper handle rotatably connected to a lower handle;

a first chamber in said lower handle, said first chamber having a bottom with a plurality of holes forming a pattern;

a second chamber in said lower handle, said second chamber having a plurality of blades;

a first foot pivotally connected to said upper handle, said first foot having a flat surface;

a second foot pivotally connected to said upper handle independently of said first foot, said second foot having a plurality of ribs sized and shaped to be inserted between said blades in said second chamber;

a stop on said upper handle between said first foot and said second foot, wherein said second foot is aligned to engage said second chamber when said second foot rests against said stop;

a post extending from said upper handle;

a cleaning piece for cleaning said holes of said first chamber, said blades of said second chamber and said ribs of said second foot; and an opening in said cleaning piece, said opening sized and shaped to receive said post for removably attaching said cleaning piece to said upper handle;

wherein said first and second feet respectively engage said first and second chambers when said upper and lower handles are rotated together.

18. The food press of claim 17, wherein said cleaning piece has a plurality of nubs forming a pattern corresponding to said pattern of said holes in said first chamber, said nubs sized and shaped to fit within said holes.

19. The food press of claim 17, wherein said cleaning piece has an edge, said edge sized and shaped to be inserted between said blades in said second chamber and between said ribs in said second foot.

20. The food press of claim 17, further comprising a stop on said upper handle, wherein said second foot is aligned to engage said second chamber when said second foot rests against said stop.

21. The food press of claim 17, wherein at least part of said second chamber is a separately formed unit and said blades are positioned in said separately formed unit.

* * * * *